United States Patent
Ye et al.

(10) Patent No.: US 9,822,239 B2
(45) Date of Patent: Nov. 21, 2017

(54) LOW-CORROSION FIRE-RESISTANT THERMOPLASTIC RESIN COMPOSITION

(71) Applicant: Shanghai Huihai Chemical Technology Co., Ltd., Shanghai (CN)

(72) Inventors: Jinbiao Ye, Shanghai (CN); Xiangdong Xu, Shanghai (CN)

(73) Assignee: Shanghai Huihai Chemical Technology Co., Ltd., Shanghai (CN)

( * ) Notice: Subject to any disclaimer, the term of this patent is extended or adjusted under 35 U.S.C. 154(b) by 22 days.

(21) Appl. No.: 14/948,205

(22) Filed: Nov. 20, 2015

(65) Prior Publication Data

US 2016/0083562 A1    Mar. 24, 2016

Related U.S. Application Data

(63) Continuation of application No. PCT/CN2014/089535, filed on Oct. 27, 2014.

(30) Foreign Application Priority Data

Sep. 24, 2014  (CN) .......................... 2014 1 0493365

(51) Int. Cl.
| | |
|---|---|
| *C08G 18/77* | (2006.01) |
| *C08K 5/49* | (2006.01) |
| *C07F 9/48* | (2006.01) |
| *C08K 5/53* | (2006.01) |
| *C08K 5/5313* | (2006.01) |
| *C08K 5/52* | (2006.01) |
| *C08K 7/14* | (2006.01) |

(52) U.S. Cl.
CPC ............. *C08K 5/5313* (2013.01); *C08K 5/52* (2013.01); *C08K 5/5205* (2013.01); *C08K 7/14* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 5,780,534 A | 7/1998 | Kleiner | |
| 6,207,736 B1 | 3/2001 | Nass et al. | |
| 6,359,171 B1 * | 3/2002 | Weferling ................. C07F 9/48 558/104 |
| 6,365,071 B1 | 4/2002 | Jenewein et al. | |
| 6,509,401 B1 | 1/2003 | Jenewein et al. | |
| 2011/0275743 A1 | 11/2011 | Ishii et al. | |

FOREIGN PATENT DOCUMENTS

| | | |
|---|---|---|
| CN | 102731566 A | 10/2012 |
| CN | 102838098 A | 12/2012 |
| DE | 225225 C | 1/1909 |
| WO | 2010/002403 A1 | 1/2010 |

OTHER PUBLICATIONS

Yang et al. Thermochimica Acta 526 (2011) 185-191.*

* cited by examiner

*Primary Examiner* — Robert T Butcher
(74) *Attorney, Agent, or Firm* — Mei & Mark LLP; Manni Li

(57) ABSTRACT

A low-corrosion fire-resistant thermoplastic resin composition comprising a thermoplastic resin, a phosphinic acid salt flame retardant, a reinforced glass fiber, and a rare earth metal salt corrosion inhibitor. The resin composition improves the corrosion resistance and mechanical performance of the metal to a great extent while maintaining the high flame resistance.

7 Claims, No Drawings

LOW-CORROSION FIRE-RESISTANT THERMOPLASTIC RESIN COMPOSITION

CROSS-REFERENCE TO RELATED APPLICATIONS

The subject application is a continuation of PCT/CN2014/089535 filed on Oct. 27, 2014, which claims priority on Chinese patent application 201410493365.2 filed on Sep. 24, 2014 in China. The contents and subject matter of the PCT and Chinese priority applications are incorporated herein by reference.

TECHNICAL FIELD

The present invention relates to polymer processing, particularly, a low-corrosion fire-resistant thermoplastic resin composition.

BACKGROUND OF THE INVENTION

Due to the excellent injection molding and machine physical properties, polyester resin and polyamide resin are applied in a wide range of fields such as mechanical and machinery components, electrical and electronic components, and automobile components. At the same time, polyester resin and polyamide resin are crystalline plastics, in particular, the glass fiber reinforced polyester resin and polyamide resin, so they are used for the extruder and injection molding machine needing the high processing temperature for melting mixing.

However, as polyester resin and polyamide resin are combustible in nature, in addition to the balance between the chemical and physical characteristics, the safety of the flame, i.e. the fire resistance is also required when they are used as the industrial materials such as the mechanical and machinery components, electrical and electronic components, and automobile components. In most cases, it is necessary to display V-0 high fire resistance under the UL-94 standard. The method giving the fire resistance to polyester resin and polyamide resin generally mixes up the halogen organic composition as the fire retardant and the antimony composition as the flame retardant agent into the resin. However, as the result of the improvement in the environmental awareness, people begin to worry about the impact of the halogen organic composition to the environment. Therefore, it has been proposed in recent years to use the fire retardant without any halogens as well as the thermoplastic resin mixed with phosphorus composition as the fire retardant.

The salt of phosphinic acid (hypophosphite) has been proven to be an effective flame retardant additive for the thermoplastic polymer, and is also applicable to the alkali metal salt and other metal salts (See DE 225225A and DE 2477727A). Calcium hypophosphite and aluminum hypophosphite have been described as particularly effective in the polyester and cause less damage to the material performance in the polymer molding plastic composition compared to the corresponding alkali metal salt. See EP 0699708A.

Some literature also disclose the synergistic interaction combination of the phosphinic acid salt and nitrogen-containing composition, which shall be a more effective fire retardant in a large amount of the polymers compared to a single hypophosphite. See PCT/EP97/01664, DE 19734437A, and DE 19737727A.

When the phosphinic acid salt exists in the fire-resistant polyester or polyamide composition as a separate component or together with other flame retardants, it usually leads to the polymer degradation to certain extent due to the higher acidity of hypophosphite, which possibly has the adverse effect on the mechanical performance and even the electrical performance. The corrosive gas produced by the flame retardant corrodes the screw of the mixing unit or the die of the injection molding. Furthermore, the corrosive gas corrodes the metals of the terminals, which contact the flame-retardant thermoplastic resin molded product, resulting in the pollution to the contact. Therefore, it is urgent to solve the problem in the corrosion of the fire-retardant resin to the metal.

At present, some published literatures elaborate several solutions to the problem, for example, see CN 201080006709.2. It is possible to improve the corrosiveness by adding a compound as follows:

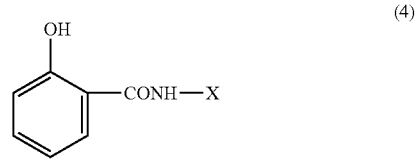

However, the compound has limited heat resistance, so it is difficult to apply for the system with the higher requirement for the processing temperature (e.g., the fiber reinforced system). CN 200880130162.X solves the problem in corrosion by adding the zinc stannate, however, the addition of zinc stannate causes degradation of the mechanical performance, in particular the impact resistance of the product. Therefore, it is urgent to solve the problem in the corrosion of the hypophosphite as an additive in the process of high-temperature molding processing.

SUMMARY OF THE INVENTION

To overcome the deficiency in the existing technology, the present invention provides a low-corrosion flame-resistant thermoplastic resin composition, which improves the corrosion to the metal to a great extent while maintaining the high flame resistance; the molded products of the composition of the present invention is used for manufacturing mechanical and machinery components, electrical and electronic components, or automobile components.

The present invention provides a low-corrosion flame-resistant thermoplastic resin composition, containing the thermoplastic resin (A), phosphinic acid salt flame retardant (B), reinforced glass fiber (C), and rare earth metal salt anti-corrosion additive. The hypophosphite flame retardant (B) is an ammonium salt, amine salt, alkali metal salt, alkali-earth metal salt, aluminum salt, zinc salt, or ferric salt, which is selected from any or more of the hypophosphite, bis-hypophosphite, the polymer of hypophosphite or the polymer of bis-hypophosphite; the rare earth metal salt anti-corrosion additive (D) is selected from the phosphinic acid rare earth metal salt and bis-hypophosphite rare earth metal salt as shown in formula (1) or (2), or one or more polymers of its hypophosphite rare earth metal salt or the polymers of its bis-hypophosphite rare earth metal salt:

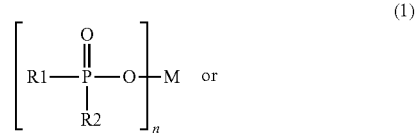

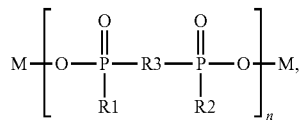

wherein $R^1$ and $R^2$ each are independently selected from a hydrogen, a linear or branched $C_1$-$C_8$ alkyl, or a phenyl; n is 3; $R^3$ is selected from any of the linear or branched $C_1$-$C_{10}$ alkylidene, arylidene, alkyl arylidene, or aryl alkylene; and M is a rare earth metal.

Preferably in the present invention, the rare earth metal salt anti-corrosion additive (D) is a salt of La or Ce; in the structure of the rare earth metal salt anti-corrosion additive (D), $R^1$, $R^2$ and $R^3$ are ethyl.

In the present invention, in the phosphinic acid salt flame retardant (B), the structure of the hypophosphite is shown in formula (3):

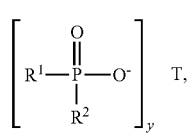

wherein either of $R^1$ and $R^2$ is hydrogen and the other is a $C_1$-$C_8$ alkyl; or both $R^1$ and $R^2$ are $C_1$-$C_8$ alkyl; T is ($C_1$-$C_4$ alkyl)$_4$N, ($C_1$-$C_4$ alkyl)$_3$NH, ($C_2$-$C_4$ alkyl OH)$_4$N, ($C_2$-$C_4$ alkyl OH)$_3$NH, ($C_2$-$C_4$ alkyl OH)$_2$N(CH$_3$)$_2$, ($C_2$-$C_4$ alkyl OH)$_2$NHCH$_3$, ($C_6H_5$)$_4$N, ($C_6H_5$)$_3$NH, ($C_6H_5CH_3$)$_4$N, ($C_6H_5CH_3$)$_3$NH, NH$_4$, melamine, guanidine, an alkali metal ion, an alkali-earth metal ion, aluminum ion, zinc ion, or ferric ion; and y is an integer of 1, 2, 3, or 4.

In the present invention, the hypophosphite may be diethyl aluminum hypophosphite.

In the present invention, the thermoplastic resin (A) is a polyester resin or polyamide resin.

In the present invention, the optimal selection of contents of the components are as follows in weight percentages: thermoplastic resin (A) at 50~85%; hypophosphite flame retardant (B) at 10~20%; reinforced glass fiber (C) at 0~30%; rare earth metal salt corrosion inhibitor at 1.5~10%; and the total weight percentage of the above components equals to 100%.

In the present invention, composition may also include an additional auxiliary flame retardant, which is melamine polyphosphate, ammonium polyphosphate, melamine ammonium phosphate, melamine ammonium polyphosphate, melamine ammonium pyrophosphate, the condensation reaction product of melamine and phosphoric acid, other reaction products of melamine and phosphoric acid, or a mixture thereof.

The low-corrosion flame-retardant thermoplastic resin composition of the present invention is molded into the product.

The beneficial effect of the present invention is that the resin composition in the present invention improves the corrosion resistance and mechanical performance of the metal to a great extent while maintaining the high flame resistance, and does not corrode the metal at the thermal treatment temperature of 270° C. and the in the course of thermal treatment for 3 hours.

DETAILED DESCRIPTION OF THE INVENTION

The present invention is further elaborated in combination with the practical examples as follows. In the present invention, the low-corrosion flame-retardant thermoplastic resin composition contains the thermoplastic resin, which is selected from at least one of the polyamide resins or polyester resins.

The polyamide resin is derived from diamine and dicarboxylic acid, and/or amine carboxylic acid, or the polyamide and copolyamide of relevant lactam, such as polyamide 2,12, polyamide 4 (poly4-aminobutyric acid), polyamide 4,6 (poly (tetramethylene adipic acid)), polyamide 6 (polycaprolactam, poly 6-amino caproic acid), polyamide 6,6 (poly(N, N'-hexamethyleneadipamide)), polyamide 6,9 (poly (hexamethylene nonane amine diacid)), polyamide 6,10 (poly (hexamethylene sebacamide)), polyamide 6,12 (poly (hexamethylene dodecane diamide)), polyamide 6/6,6 (poly (hexamethylene caproamide-co-caprolactam)), polyamide 7 (poly 7-aminopimelic acid), polyamide 7,7 (heptamertic methylene sebacamide), polyamide 8 (poly 8-aminocaprylic acid), polyamide 8,8 (poly-8 methylene suberamide), polyamide 9 (poly 9-amino pelargonic acid), polyamide 9,9 (poly-9 methylene pelargonamide), polyamide 10 (poly 10-glycoleucine), polyamide 10,9 (poly-10 methylene pelargonamide)), polyamide 10,10 (poly-10 methylene decanamide), polyamide 11(poly 11-aminoundecanoic acid), polyamide 12 (polylauryl lactam), and derived from the aromatic poly amide of the m-xylene, diamine and adipic acid; and the polyamide made of the hexamethylene diamine and m-phthalic acid and/or terephthalic acid (poly-6 methylene isophthalamide or poly-6 methylene terephthalamide), which shall be made with the elastomer as the modifier (If appropriate), such as the poly 2,4,4-trimethyl hexamethylene terephthalamide or poly-m-phenylene isophthalamide; the above polyamide and polyolefin, and olefin copolymer, and ionomer, or the chemical placed or grafted elastomer; or the polyether, such as the blocked copolymer of the polyethylene glycol, polypropylene glycol, or polytetramethylene glycol; or the copolyamide or polyamide modified with EPDM or ABS; or the polyamide condensed in the process of treatment ("RIM polyamide system"). Polyester resin is derived from the dicarboxylic acid and diol, and/or hydroxy carboxylic acid, or the polyester of corresponding lactone, such as polyethylene glycol terephthalate, polybutylene terephthalate (Celanex2500, Celanex2002, Celanese; Ultradur, BASF), poly (1,4-Bis-hydroxymethyl cyclohexane polyethylene terephthalate), polyhydroxy benzoate, and the blocked poly-ether ester derived from the polyether with the hydroxyl end group; as well as the polyester modified by polycarbonate or MBS.

In the present invention, the flame-retardant thermoplastic resin composition also contains the phosphinic acid salt flame retardant that is at least one selected from a phosphinic acid salt, a bis-phosphinic acid salt, a polymer of the phosphinic acid salt, Phosphinic acid salt is a compound as shown in the following formula:

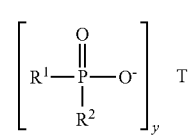

Wherein either of $R^1$ and $R^2$ is hydrogen, and the other is $C_1$-$C_8$ alkyl; or both $R^1$ and $R^2$ are $C_1$-$C_8$ alkyl; T is $(C_1$-$C_4$ alkyl$)_4$N, $(C_1$-$C_4$ alkyl$)_3$NH, $(C_2$-$C_4$ alkyl OH$)_4$N, $(C_2$-$C_4$ alkyl OH$)_3$NH, $(C_2$-$C_4$ alkyl OH$)_2$N(CH$_3)_2$, $(C_2$-$C_4$ alkyl OH$)_2$NHCH$_3$, $(C_6H_5)_4$N, $(C_6H_5)_3$NH, $(C_6H_5CH_3)_4$N, $(C_6H_5CH_3)_3$NH, NH$_4$, melamine, guanidine, an alkali metal ion, an alkali-earth metal ion, aluminum ion, zinc ion, or ferric ion; and y is an integers of 1 to 4.

In the present invention, as the phosphinic acid salt, it is allowed to use the polymer of the above phosphinic acid salt or the polymer of the bis-phosphinic acid salt. Considering the mechanical property, the corrosion to metal, fluidity, fire resistance, and other excellent aspects, the preference is given to the aluminum as the metal composition, in particular ethyl methyl phosphinic acid aluminum salt or diethyl phosphinic acid aluminum salt, and the higher preference is given to diethyl aluminum hypophosphite.

In the present invention, the rare earth metal salt corrosion inhibitor is a salt of La or Ce salt, and preferably an La salt. The structure hereof is as shown in formula (1) or formula (2):

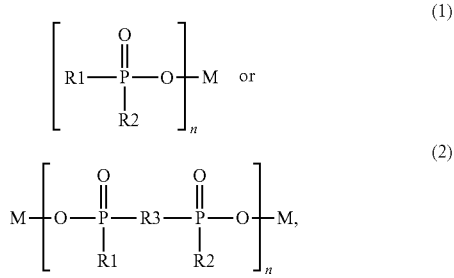

In the present invention, the rare earth salt corrosion inhibitor may also use the polymer of the above hypophosphite or the polymer of the bis-hypophosphite. Considering the mechanical property, the corrosion to metal, fluidity, fire resistance, and other excellent aspects, the preference is given to ethyl methyl phosphinic acid lanthanum salt, in particular diethyl phosphinic acid lanthanum salt. By the compound in the structure as shown above, it is possible to improve the corrosion of the flame-retardant thermoplastic resin composition to the metal to a great extent, and to improve the mechanical performance of the composition to a great extent. The reinforced glass fiber is also included in the composition of the present invention.

On the total content of the thermoplastic resin, the phosphinic acid salt flame retardant, the reinforced glass fiber, and the rare earth metal salt corrosion inhibitor make up equal to 100% of the weight in the composition of the present invention, the quantity of the thermoplastic resin is 50~85% of the weight, and the preferred quantity is 50~75% of the weight, so as to obtain the good mechanical characteristics. The quantity of the phosphinic acid salt flame retardant is 10~20% of the weight, and the preferred quantity is 10~15% of the weight, so as to obtain the flame retardant efficiency and the good mechanical characteristics. The content of the reinforced glass fiber is 0~30% of the weight; the content of the rare earth metal salt corrosion inhibitor is 1.5~10% of the weight, and the preferred content is 2~5% of the weight; in case of the content equal to at least 1.5% of the weight, the corrosion to the metal is improved to a great extent. In case of the content less than 5% of the weight, it is possible to obtain the flame retardant thermoplastic resin with the excellent mechanical strength while maintaining the high fire resistance.

In the present invention, the flame-retardant thermoplastic resin composition may also contain an additional auxiliary flame retardant selected from melamine phosphate, bis-melamine phosphate, penta-melamine triphosphate, tri-melamine bis-phosphate, tetra-melamine triphosphate, hexa-melamine pentaphosphate, melamine bisphosphate, melamine tetraphosphate, melamine pyrophosphate, melamine polyphosphate, melam polyphosphate, melem polyphosphate, or melamine polyphosphate, or contain the compound with the fire resistance known to the public, such as zinc compound, magnesium compound, calcium compound, aluminum compound, manganese compound, tin compound, or any of the carbodiimide or (poly) isocyanate.

The preferred additional auxiliary flame retardant is any one of tri-(2-hydroxyethyl) isocyanate and the oligomer ester of the aromatic polycarboxylic acid, benzoguanamine, tri-(2-hydroxyethyl) isocyanate, allantoin, glycoluril, melamine, melamine isocyanurate, urea cyanurate, dicyandiamide or guanidine; the carbodiimmide such as carbonyl di-caprolactom; the magnesium compound such as magnesium oxide, magnesium hydroxide, hydrotalcite, bis-hydrotalcite, magnesium carbonate or magnesium calcium carbonate; the calcium compound such as calcium hydroxide, calcium oxide, and hydrocalumite; the zinc compound such as zinc oxide (e.g. activated zinc oxide), zinc hydroxide, hydrated zinc oxide, zinc carbonate (e.g. alkaline zinc carbonate, and anhydrous zinc carbonate), zinc stannate, hydroxy zinc stannate, alkaline zinc silicate, alkaline zinc phosphate, alkaline zinc borate, alkaline zinc molybdate, or alkaline zinc sulfide; the aluminum compound such as aluminum oxide, aluminum hydroxide, gibbsite, or aluminum phosphate; the manganese compound such as manganese oxide, manganese hydroxide; the tin compound such as tin oxide.

In the present invention, the flame-retardant thermoplastic resin composition has the property of no corrosion to the metal at the heat treatment temperature of 150~350° C., the heat treatment time of 0.01~1 hour, the preferred heat treatment temperature of 270° C., and the heat treatment time of 3 hours. The so-called property of no corrosion to the metal at the heat treatment temperature of 270° C. and heat treatment time of 3 hours means that adding the particles or molded product containing approximately 10 g of the resin composition into the glass petri dish with a cover and in the diameter of 60 mm, and placing the watch glass in the diameter of 25 mm onto the particles or molded product, placing the copper plate in the length of 10 mm, width of 20 mm, and thickness of 1 mm onto the watch glass, and then placing the above glass cover, so as to make the sample; put such sample into the heat ageing chamber at the temperature of 270° C. and stay for 3 hours; after cooling the sample down to the room temperature, visually observe the corrosion to the copper plate in the sample. Specially, since the copper plate becomes green because the corrosion of such plate produces the verdigris in aerugo, it must be judged as corrosive if the change of the color into green is observed. Such property is available by the flame-retardant thermoplastic resin composition in the present invention, i.e., the compound in the specific structure containing the specific amount of (B) phosphinic acid salt flame retardant and (D) the rare earth metal salt corrosion inhibitor.

In addition, the heat treatment temperature of 270° C. is also the mixing temperature range of the polyester resin and polyamide resin in the process of the general melting mixing and the molding temperature range in the process of injection molding. Therefore, the material subject to metal corrosion observed under the heat treatment conditions, including the heat treatment temperature of 270° C. and heat treatment time of 3 hours, may lead to the metal corrosion to the mixing screw and the metal corrosion to the die used for injection molding. Moreover, the material subject to metal corrosion observed under the heat treatment conditions, including the heat treatment temperature of 270° C. and heat treatment time of 3 hours, implies the corrosion to the terminal in contact with the molded product and the occurrence of the contact pollution.

The corrosion degree is measured by the spot test method, which is a useful model for comparative analysis of the corrosion strength and abrasion performance of the polymer melt. The test device is composed of two test samples made of Q235 steel and arranged in pairs so as to form the rectangular channel slit in the length of 12 mm, width of 16 mm, and height of 0.4 mm for the polymer melt. The polymer melt is fed through such silt by the extruder, so as to produce the highly local shearing stress and shearing rate in the silt. The abrasion is described by measuring the weight of the test sample with the analysis balance at the accuracy of 1 mg. The weight of the test sample is measured before and after the corrosion test of the polymer with the material throughput of 11 kg. The sample shall be taken out from the nozzle and the adhered polymer shall be cleaned off in two steps. The hot polymer is removed by wiping with the soft textile (cotton). The following cleaning step shall be implemented by heating the test sample in the mixture of dichlorobenzene and phenol at ratio of 1:1 at the temperature of 60° C. for 25 minutes. The remaining polymer shall be removed by wiping with the soft cotton cloth.

In the present invention, it is allowed to coordinate with the publicly known flame retardants such as the siloxane flame retardant, phenolic resin, fluoric resin, and inorganic flame retardant.

As the above siloxane flame retardant, the siloxane resin and silicone oil are enumerated. For the above siloxane resin, the resin in the three-dimensional network structure combining the structural units of $SiO_2$, $RSiO3/2$, $R_2SiO$, and $R_3SiO1/2$ is enumerated. R is an alkyl such as the methyl, ethyl and propyl, or the aromatic group such as phenyl and benzyl, or the above substituent group containing the ethylene. For the above silicone oil, the polydimethylsiloxane (dimethyl silicone polymer) and the modified polysiloxane acquired by modifying at least one of the methyl at the side chain or terminus of the polydimethylsiloxane, which is selected from at least one perssad of hydrogen element, alkyl, cyclohexyl, phenyl, benzyl, amido, epoxy group, polyether, carboxyl, sulfydryl, chlorine alkyl, alkyl higher alcohol ester group, alcohol group, aralkyl, vinyl, or trifluoromethyl, or their mixture are enumerated.

The above fluoric resin refers to the resin with the substance molecule containing fluorine. Teflon, polyhexafluoropropylene, (tetrafluoroethylene/hexafluoropropylene) copolymer, (tetrafluoroethylene/perfluorinated alkyl vinyl ether) copolymer, (tetrafluoroethylene/ethylene) copolymer, (hexafluoropropylene/propylene) copolymer, poly 1,1-vinyl-difluoride, poly (1, 1-difluoride/ethylene) copolymer are enumerated. Preferably, it is Teflon, (tetrafluoroethylene/hexafluoropropylene) copolymer, (tetrafluoroethylene/hexafluoropropylene) copolymer, (tetrafluoroethylene/ethylene) copolymer, poly 1, 1-vinyl-difluoride, in particular the Teflon, and (tetrafluoroethylene/ethylene) copolymer.

In addition, the quantity of the fluoric resin shall be 100 parts by weight relative to the total of the thermoplastic resin, hypophosphite flame retardant, reinforced glass fiber, and rare earth metal salt corrosion inhibitor; preferably at 0.05~2.0 parts by weight, more preferably, 0.1~1.5 parts by weight, and most preferably, 0.15~1.0 part by weight; with 0.05 part by weight, it is possible to prevent the dropping of the melt upon the combustion; with 2.0 parts by weight, it is possible to acquire the good mechanical characteristics.

In the present invention, it is possible to mix with the thermoplastic resin in the present invention. In addition to the ethylene resin, as the resin with the improved impact strength, it is possible to enumerate the ethylene-propylene copolymer, ethylene-propylene-disconjugated diene copolymer, ethylene-1-butene copolymer, natural rubber, thiokol, polysulfide rubber, polyether rubber, epichlorohydrin rubber, and the anhydrides such as the maleic anhydride used for ethylene, the glycidyl methacrylate, and the modified olefin resin produced by epoxy modification of the epoxidizing agent, and further to enumerate the resin with various degrees of cross linking, and the resin with various microstructures, such as cis-NMF and trans-NMF. For the above anhydrides such as the maleic anhydride used for ethylene, the glycidyl methacrylate, and the modified olefin resin produced by epoxy modification of the epoxidizing agent, it is possible to enumerate ethylene/glycidyl methacrylate, ethylene/1-butylene/maleic anhydride, ethylene/propylene/maleic anhydride, ethylene/maleic anhydride, and epoxidized olefinic resin produced by epoxidizing the peroxide used for ethylene as the specific examples; as the examples available in the market, it is possible to enumerate the E (ethylene/glycidyl methacrylate) produced by Sumitomo Chemical Co., Ltd., and the MH-5010 and MH-5020 (ethylene/1-butylene/maleic anhydride) produced by Mitsui Chemical Co., Ltd., which may be allowed to be used either alone or in mixture, along with ethylene resin. In particular, since the ethylene/1-butylene/maleic anhydride can improve the impact strength to a great extent, it is preferred.

In the present invention, the composition of the present invention may further comprise a stabilizer, which has an extremely good resistance to heat ageing even if exposed to the high temperature for a long term, may mix with the hindered phenol antioxidant, phosphite ester antioxidant, and sulfur ether antioxidant, which shall be combined for use and mixing. Considering the improvement of the resistance to heat ageing, relative to 100 parts by weight of (A), (B), (C), and (D), the amount of the stabilizer is preferably 0.01~2.0 parts by weight, more preferably, 0.02~1.5 parts by weight, and most preferably, 0.03~1.0 part by weight. By using 0.01 part by weight or more as the amount for the stabilizer, it is possible to fully improve the heat ageing.

In the present invention, by further mixing with at least one of carbon black, titanium oxide, and the pigment and/or dye in various colors, it is possible to improve and regulate the color, climate (light) resistance, and conductivity of the resin in various colors. With regard to the quantity of the pigment and/or dye, relative to 100 parts by weight of (A), (B), (C), and (D), it is preferably used at 0.01~3.0 parts by weight, more preferably 0.02~2 parts by weight, and most preferably 0.03~1.0 part by weight. By using 0.01 part by weight or more, it is effective to regulate color, climate (light) resistance, and conductivity; by using less than 3.0 parts by weight, it is possible to obtain the good mechanical characteristics. In addition, for the above carbon black, it is possible to enumerate channel black, furnace black, acetylene black, anthracene black, lampblack, pine black, and graphite, and preferably carbon black with an average particle size less than 500 nm and the dibutyl phthalate oil absorption of 50~400 cm/100 g. Aluminum oxide, silicon oxide, zinc oxide, zirconium oxide, polyhydric alcohol, and silane coupling agent as the treating agent may be used for treatment.

In addition, for the titanium oxide, the preference shall be given to the titanium oxide in the crystallization type of rutile or anatase and the average particle size less than 5 μm. The aluminum oxide, silicon oxide, zinc oxide, zirconium oxide, polyhydric alcohol, and silane coupling agent as the treating agent shall be used for treatment. Furthermore, in order to improve the dispersion of flame-retardant thermoplastic resin composition in the present invention and/or improve the operability of manufacturing, the above carbon black, titanium oxide, and the pigment and/or dye in various colors may be made into material melted and mixed with various thermoplastic resins or only mixed with various thermoplastic resins for use. In addition, it is also allowed to use the material, which is made by mix at least one type of publicly known additives such as ultraviolet light absorber, light stabilizer, plasticizer, and antistatic agent with the flame-retardant thermoplastic resin composition and molded product in the present invention without the prejudice to the purpose of the present invention.

The molded product formed from the flame-retardant thermoplastic resin composition in the present invention may be used as the molded products of the mechanical and machinery components, electrical and electronic components or automobile components, which shall utilize its high resistance to fire and the corrosion to the metal and other excellent features.

In addition, as the specific molded products of the mechanical and machinery components, electrical and electronic components or automobile components, it is allowed to enumerate the molded products such as the circuit breaker, electromagnetic shutter, focusing box, flyback converter, the fixator of photocopier and/or printer, and the molded products such as general household electrified products, the enclosure of OA machine, cooling fan, variable capacitor box component, various terminal boards, converters, printed wiring boards, housings, wiring boards, spools, connectors, relays, CD drive chassis, transformers, switchgears, socket components, motor components, sockets, plugs, capacitors, various boxes, resistors, electrical and electronic components attached with metal terminal and/or conductor, wire-related components, charger-related components, smart ammeter-related components, computer-related components, printer-related components, audio and lighting components of stereo equipment, telecommunication and telephone set-related components, air conditioner components, VTR and/or TV, refrigerator, washing machine, dust collector, and other household appliance components, photocopier components, fax machine components, optical machine components, automobile ignition components, automobile connectors, and various electrical components used for automobile.

The flame-retardant thermoplastic resin composition of the present invention is available by the publicly known method.

For example, it is allowed to pre-mix the thermoplastic resin, hypophosphite, and rare earth metal salt, and then feed it to the extruder for the full melting mixing to obtain such composition, or to feed the specified amount of the components with the doser such as weight feeder into the extruder respectively for full melting mixing in order to make such composition. As the example of the above premixing, the dry mixing is allowed. However, the mechanical mixing devices such as the drum, spiral ribbon mixer and Henschel mixer. The said mixing device adopts the single-screw extruder or multi-screw extruder. The effective screw length (L) of the extruder (Equipped with mixing device) is 4-200 D, and the optimal screw length is 10-50 D (D means the diameter of the screw). In addition, the fiber reinforced material and/or the inorganic failing material other than the fiber reinforced material shall be added by the side feeder located between the feeding component and discharging component of the multi-screw extruder such as double-screw extruder. In addition, if the liquid additive is used, it is allowed to add it with the charging nozzle and the plunger pump located between the feeding component and discharging component of the multi-screw extruder such as double-screw extruder, and/or to feed with the dosing pump from the feeding component.

The temperature of melting mixing is the temperature at which the thermoplastic resin is melted, and the preferred temperature ranges from 150° C. to 350° C. In order to reduce the corrosion to the metal components used in the extruder and other mixing units, preferably a temperature lower than 300° C. may be used, more preferably, a temperature lower than 280° C., and most preferably at a temperature lower than 260° C. In order to achieve the excellent mechanical strength and fluidity and reduce the quantity of the gas produced upon heating, preferably, the temperature is higher than 200° C., more preferably at higher than 220° C., and most preferably at higher than 240° C. In the present invention, the melting temperature shall be 250-290° C. for polyethylene terephthalate (PET), 230-270° C. for polybutylene terephthalate (PBT), 260-290° C. for polyamide 6 (PA6), and 260-290° C. for polyamide 6,6 (PA6,6).

In addition, when making the flame-retardant thermoplastic resin composition, the common single-screw extruder, double-screw extruder, three-screw extruder, and conical extruder, and the kneader-type mixing mill are used to arrange in line, so as to obtain from the particle shape by cutting with the strand cutter.

Such granular flame-retardant thermoplastic resin composition may be available by the injection molding by the publicly known method. In addition to the common injection molding method, there are also the known gas auxiliary method, double-color molding method, sandwich molding, in-die molding, insert molding, and injection compression molding, any of which is optimal.

EXAMPLES

The present invention is described in detail in combination with the examples of implementation. However, it is understood that the following examples of implementation are only the illustration to the implementation mode of the present invention, but not the limitation to the scope of the present invention.

Example 1. Preparation of Flame-Retardant Thermoplastic Resin and Resin Composition The components of the flame retardant and the polymer particles are mixed with the additive, and added into the double-screw extruder at the temperature of 230~260° C. (To make reinforced flame-retardant PBT, i.e., GRPBT) or 260~280° C. (To make the reinforced flame-retardant PA66, i.e. GRPA66). Extract the homogenized polymer extrudate, cool down in the water bath, and then pelletize to obtain the flame-retardant thermoplastic resin composition. The sources of the raw materials are shown in Table 1. The preparation methods for the diethyl phosphinic acid lanthanum salt and the diethyl phosphinic acid lanthanum salt dimer are shown as follows. The other raw materials shall be available in the market except for the specially specified.

D-1

Synthesis of diethyl phosphinic acid lanthanum salt: Add 101.8 g of diethyl phosphinic acid sodium salt and 400 g of the water solution into the reactor, rise the temperature to 90° C. while stirring, and then start to add drop by drop 248.5 g of the water solution containing 57.4 g of lanthanum chloride in one hour, and then preserve the heat for one hour; at the end of the reaction, filter, clean, dry, and crush, in order to obtain 106.5 g of the diethyl phosphate lanthanum (theoretical value of 117.8 g).

D-2

Synthesis of diethyl phosphinic acid lanthanum salt dimer: Add 91.3 g of diethyl phosphinic acid sodium salt dimer and 400 g of water solution into the reactor. The structural formula of the diethyl phosphinic acid sodium salt dimer is shown in general formula (2), and both $R_1$ and $R_2$ are ethyl; rise the temperature to 90° C. while stirring, and then start to add drop by drop 248.5 g of the water solution containing 57.4 g of lanthanum chloride in one hour, and then preserve the heat for one hour; at the end of the reaction, filter, clean, dry, and crush, in order to obtain 95.5 g of the diethyl sodium hypophosphite dimer (theoretical value of 107.3 g).

Example 2. UL-94 Test

After the full drying, process the molded composition in the injection molding machine at the melt temperature of 240~270° C. (GRPBT) or 260~290° C. (GRPA66) to obtain the test sample. With regard to the test sample generated from each mixture, the test sample in the thickness of 1.6 mm shall be used to measure the burning level under UL94 "Test for Flammability of Plastic Materials for Parts in Devices and Appliances" ("Test for Flammability of Plastic Materials for Parts in Devices and Appliances", the standard for plastic combustibility issued by USA Underwriters Laboratories Corporation) (Underwriters Laboratories). The following burning levels are given under UL-94:

V0: Afterflame time for each individual specimen $t_1$ or $t_2$ is no more than 10 seconds, the total afterflame time for any condition set is no more than 50 seconds, no fire drops, the specimen is not burned up completely, afterflame plus afterglow time for each individual specimen after second flame application is no more than 30 seconds.

V-1: Afterflame time for each individual specimen $t_1$ or $t_2$ is no more than 30 seconds, the total afterflame time for any condition set is no more than 250 seconds, afterflame plus afterglow time for each individual specimen after second flame application is no more than 60 seconds. other standard as V-0.

V-2: The cotton indicator is fire dropped and ignited. The other standards shall be the same as those for V-1.

Unclassifiable (n.d.): Failing to meet the requirements for burning level of V-2.

Example 3. Metal Corrosion Test

1) Copper strip corrosion test:

Add the particles or molded product containing approximately 10 g of the resin composition into the glass petri dish with a cover and in the diameter of 60 mm, and place the watch glass in the diameter of 25 mm onto the particles or molded product, place the copper plate in the length of 10 mm, width of 20 mm, and thickness of 1 mm onto the watch glass, and then place the above glass cover, so as to make the sample; put such sample into the heat ageing chamber at the temperature of 270° C. and stay for 3 hours; after cooling the sample down to the room temperature, visually observe the corrosion to the copper plate in the sample. Specially, since the copper plate will become green because the corrosion of such plate produces the verdigris in aerugo, it shall be judged as corrosive if the change of the color into green is observed.

2) Steel Corrosion Test

The test device shall be composed of two test samples made of Q235 steel and arranged in pairs so as to form the rectangular channel slit in the length of 12 mm, width of 16 mm, and height of 0.4 mm for the polymer melt. The polymer melt is fed through such silt by the extruder, so as to produce the highly local shearing stress and shearing rate in the silt. The abrasion shall be described by measuring the weight of the test sample with the analysis balance at the accuracy of 1 mg.

The weight of the test sample shall be measured before and after the corrosion test of the polymer with the material throughput of 11 kg. The sample shall be taken out from the nozzle and the adhered polymer shall be cleaned off in two steps. The hot polymer is removed by wiping with the soft textile (cotton). The following cleaning step shall be implemented by heating the test sample in the mixture of dichlorobenzene and phenol at ratio of 1:1 at the temperature of 60° C. for 25 minutes. The remaining polymer shall be removed by wiping with the soft cotton cloth.

The performance of notched izod impact strength shall be measured according to DIN EN ISO180. This reference number refers to the standardized high strain rate test for the value of the energy absorbed during the process of fracture. Such absorbed energy is the measurement of the toughness of the given material. The low izod impact strength of the composition containing the same contents of polymer, reinforced glass fiber, and flame retardant indicates the partial decomposition of the polymer matrix.

TABLE 1

| (A) Thermoplastic resin | Poly ethylene terephthalate (In abbreviation PBT2) | GE307 |
|---|---|---|
| | Nylon 66(PA66) | BASFA3 |
| (B) Hypophosphite | Diethyl aluminum hypophosphite | OP1240 |
| (C) Glass fiber | HP3786 (3.2 MM) Taiwan Company | Bicheng |
| (D) Rare earth metal salt | See synthesis | |
| (E) Nitrogen compound | Melamine pyrophosphate MPP | CibaM200 |
| (F) Flexibilizer | Ethylene/butene/maleic anhydride copolymer | MH-5020 |
| (G) Antioxidant | Irganox1010/168 = 1:1 | |

Please see Table 2 for the components, and the results of the corrosion test and notched izod impact strength test of the composition in the examples of implementation.

TABLE 2

| | | Examples of Implementation | | | | | | | | |
|---|---|---|---|---|---|---|---|---|---|---|
| | | 1 | 2 | 3 | 4 | 5 | 6 | 7 | 8 | 9 |
| (A) Thermoplastic resin | PBT | 49.8 | 49.8 | 49.8 | 49.8 | 49.8 | 49.8 | 49.8 | | |
| | PA66 | | | | | | | | 52 | 52 |
| (B) Hypophosphite | OP1240 | 13 | 12 | 11.5 | 11 | 11 | 10 | 12 | 12 | 10 |
| (C) Glass fiber | | 30 | 30 | 30 | 30 | 30 | 30 | 30 | 30 | 30 |
| (D) Rare earth metal salt | D-1 | | 1 | 1.5 | | 2 | 3 | | | 2 |
| | D-2 | | | | 2 | | | 1 | | |
| (E) Nitrogen compound | Melapur 200/70 | 5 | 5 | 5 | 5 | 5 | 5 | 5 | 6 | 6 |
| (F) Flexibilizer | | 2 | 2 | 2 | 2 | 2 | 2 | 2 | | |

TABLE 2-continued

| | | Examples of Implementation | | | | | | | | |
|---|---|---|---|---|---|---|---|---|---|---|
| | | 1 | 2 | 3 | 4 | 5 | 6 | 7 | 8 | 9 |
| (G) Antioxidant | 1010/168 = 1/1 | 0.2 | 0.2 | 0.2 | 0.2 | 0.2 | 0.2 | 0.2 | | |
| Corrosion (Visual observation) | Copper strip | Yes | Micro | No | No | No | No | Yes | Yes | No |
| | Q235 | Yes | Micro | No | No | No | No | Yes | Yes | No |
| UL-94 (1.6 mm) | | VO | VO | VO | VO | VO | VO | VO | VO | VO |
| Notch impact strength (KJ/M2) | | 8.3 | 9 | 9.5 | 8.7 | 9.1 | 8.7 | 8.5 | | |

We claim:

1. A low-corrosion flame-resistant thermoplastic resin composition consisting of
   a thermoplastic resin,
   a phosphinic acid salt,
   a reinforced glass fiber,
   a rare earth metal salt, and
   optionally, an auxiliary flame retardant,
   wherein the phosphinic acid salt is selected from the group consisting of an ammonium salt, an amine salt, an alkali metal salt, an alkali-earth metal salt, an aluminum salt, a zinc salt, and ferric salt, and the phosphinic acid salt is a hypophosphite, a bis-hypophosphite, a polymer of the phosphinic acid salt, or a polymer of the bis-hypophosphite;
   the rare earth metal salt is a phosphinic acid rare earth metal salt having a formula (1) or (2):

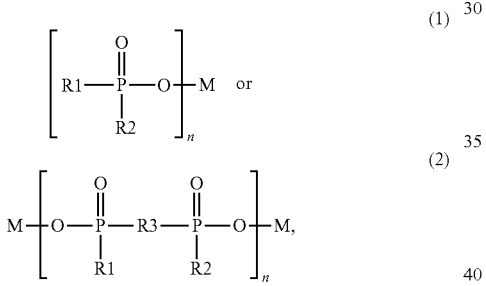

$R^1$ and $R^2$ are each independently selected from a linear or branched $C_1$-$C_8$ alkyl or a phenyl; n is 3; $R^3$ is selected from any of the linear or branched $C_1$-$C_{10}$ alkylidene, arylidene, alkyl arylidene, or aryl alkylene; and M is a rare earth metal, and
   the auxiliary flame retardant is selected from the group consisting of a melamine polyphosphate, ammonium polyphosphate, melamine ammonium phosphate, melamine ammonium polyphosphate, melamine ammonium pyrophosphate, a reaction product of melamine and phosphoric acid, and a mixture thereof.

2. The low-corrosion flame-resistant thermoplastic resin composition as stated in claim 1, wherein the rare earth metal is La or Ce.

3. The low-corrosion flame-resistant thermoplastic resin composition as stated in claim 1, wherein $R^1$ and $R^2$ are ethyl.

4. The low-corrosion flame-resistant thermoplastic resin composition as stated in claim 1, wherein the phosphinic acid salt has a structure as in formula (3):

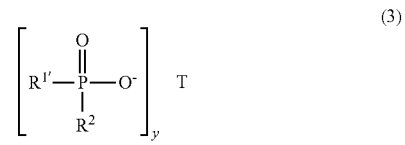

wherein either $R^{1'}$ or $R^{2'}$ is a hydrogen, and the other is a $C_1$-$C_8$ alkyl; or both of $R^{1'}$ and $R^{2'}$ are $C_1$-$C_8$ alkyl;
T is selected from the group consisting of $(C_1$-$C_4$ alkyl$)_4$N, $(C_1$-$C_4$ alkyl$)_3$NH, $(C_2$-$C_4$ alkyl OH$)_4$N, $(C_2$-$C_4$ alkyl OH$)_3$NH, $(C_2$-$C_4$ alkyl OH$)_2$N(CH$_3$)$_2$, $(C_2$-$C_4$ alkyl OH$)_2$NHCH$_3$, $(C_6H_5)_4$N, $(C_6H_5)_3$NH, $(C_6H_5CH_3)_4$N, $(C_6H_5CH_3)_3$NH, NH$_4$, melamine, guanidine, alkali metal, alkali-earth metal ions, aluminum ion, zinc ion, and ferric ion; and y is an integer of 1 to 4.

5. The low-corrosion flame-resistant thermoplastic resin composition as stated in claim 1, wherein the phosphinic acid salt is diethyl phosphinic acid aluminum salt.

6. The low-corrosion flame-resistant thermoplastic resin composition as stated in claim 1, wherein the thermoplastic resin is a polyester resin, a polyamide resin, or a mixture thereof.

7. The low-corrosion flame-resistant thermoplastic resin composition as stated in claim 1, wherein the thermoplastic resin is 50~85% weight percentage of the composition, the phosphinic acid salt is 10~20% weight percentage of the composition, the reinforced glass fiber is up to ~30% weight percentage of the composition, and the rare earth metal salt is 1.5~10% weight percentage of the composition, and
   the total weight percentage of the thermoplastic resin, the phosphinic acid salt, the reinforced glass fiber, and the rare earth metal salt equals to 100%.

* * * * *